United States Patent
Wang

(10) Patent No.: US 10,726,573 B2
(45) Date of Patent: *Jul. 28, 2020

(54) OBJECT DETECTION METHOD AND SYSTEM BASED ON MACHINE LEARNING

(71) Applicant: PIXART IMAGING INC., Hsin-Chu (TW)

(72) Inventor: Guo-Zhen Wang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 256 days.

This patent is subject to a terminal disclaimer.

(21) Appl. No.: 15/870,109

(22) Filed: Jan. 12, 2018

(65) Prior Publication Data

US 2018/0137643 A1    May 17, 2018

Related U.S. Application Data

(63) Continuation-in-part of application No. 15/670,511, filed on Aug. 7, 2017.

(30) Foreign Application Priority Data

Aug. 26, 2016 (TW) ............... 105127446 A
Nov. 14, 2016 (TW) ............... 105137097 A

(51) Int. Cl.
| | | |
|---|---|---|
| *G06T 7/70* | (2017.01) | |
| *G06K 9/66* | (2006.01) | |
| *G06K 9/62* | (2006.01) | |
| *G06T 5/20* | (2006.01) | |
| *G06T 7/246* | (2017.01) | |
| *G06K 9/46* | (2006.01) | |

(52) U.S. Cl.
CPC ............ *G06T 7/70* (2017.01); *G06K 9/46* (2013.01); *G06K 9/6202* (2013.01); *G06K 9/6267* (2013.01); *G06K 9/6273* (2013.01); *G06K 9/66* (2013.01); *G06T 5/20* (2013.01); *G06T 7/248* (2017.01); *G06T 2207/20081* (2013.01); *G06T 2207/20084* (2013.01)

(58) Field of Classification Search
CPC combination set(s) only.
See application file for complete search history.

(56) References Cited

U.S. PATENT DOCUMENTS

| | | |
|---|---|---|
| 6,400,835 B1 | 6/2002 | Lemelson |
| 9,135,307 B1 | 9/2015 | Panda et al. |

(Continued)

FOREIGN PATENT DOCUMENTS

| | | |
|---|---|---|
| CN | 1808468 A | 7/2006 |
| CN | 101042706 A | 9/2007 |

(Continued)

*Primary Examiner* — Mekonen T Bekele
(74) *Attorney, Agent, or Firm* — Li & Cai Intellectual Property (USA) Office

(57) ABSTRACT

The present disclosure discloses an object detection method based on machine learning. The object detection method senses a motion of an object by a motion sensor to generate a testing image, captures the testing image by an image sensor to transmit a sensed image to an object detection device, and detects a position of the object in the sensed image by the object detection device. Therefore, the present disclosure increases the accuracy of image recognition under various conditions.

15 Claims, 11 Drawing Sheets

(56) References Cited

U.S. PATENT DOCUMENTS

| | | |
|---|---|---|
| 9,280,560 B1 | 3/2016 | Dube et al. |
| 9,442,176 B2 * | 9/2016 | Bulan .................. G06T 7/20 |
| 9,720,934 B1 | 8/2017 | Dube et al. |
| 2006/0256111 A1 | 11/2006 | Chihoub et al. |
| 2007/0226193 A1 | 9/2007 | Todaka |
| 2008/0137956 A1 * | 6/2008 | Yang .................. G06K 9/00342 |
| | | 382/181 |
| 2011/0026810 A1 | 2/2011 | Hu |
| 2011/0221666 A1 | 9/2011 | Newton et al. |
| 2012/0219210 A1 * | 8/2012 | Ding .................. G06K 9/4642 |
| | | 382/159 |
| 2014/0078320 A1 * | 3/2014 | Hong .................. H04N 5/217 |
| | | 348/208.1 |
| 2014/0118270 A1 | 5/2014 | Moses et al. |
| 2015/0015569 A1 | 1/2015 | Jung et al. |
| 2015/0117704 A1 * | 4/2015 | Bulan .................. G06T 7/20 |
| | | 382/103 |
| 2015/0142441 A1 | 5/2015 | Kim et al. |
| 2015/0288883 A1 * | 10/2015 | Shigeta .................. G06F 3/011 |
| | | 345/642 |
| 2015/0363634 A1 | 12/2015 | Yin et al. |
| 2016/0239726 A1 | 8/2016 | Yu |
| 2016/0259995 A1 | 9/2016 | Ishii et al. |
| 2016/0379075 A1 | 12/2016 | Ando |
| 2017/0174227 A1 | 6/2017 | Tatourian et al. |
| 2017/0193680 A1 * | 7/2017 | Zhang ................ G01N 21/9501 |
| 2017/0243051 A1 | 8/2017 | Chukka et al. |
| 2018/0286037 A1 * | 10/2018 | Zaharchuk .............. G06T 5/002 |
| 2019/0197667 A1 * | 6/2019 | Paluri .................. G06K 9/4652 |
| 2019/0220977 A1 * | 7/2019 | Zhou ...................... G06N 3/084 |
| 2019/0295302 A1 * | 9/2019 | Fu ............................ G06T 11/60 |

FOREIGN PATENT DOCUMENTS

| | | |
|---|---|---|
| CN | 101140625 A | 3/2008 |
| CN | 101803389 A | 8/2010 |
| CN | 102024031 A | 4/2011 |
| CN | 103095977 A | 5/2013 |
| CN | 103425991 A | 12/2013 |
| CN | 104217216 A | 12/2014 |
| CN | 104239873 A | 12/2014 |
| CN | 104504669 A | 4/2015 |
| CN | 105095919 A | 11/2015 |
| CN | 105631439 A | 6/2016 |
| CN | 105812746 A | 7/2016 |
| JP | 2010216919 A | 9/2010 |

* cited by examiner

54

55

US 10,726,573 B2

OBJECT DETECTION METHOD AND SYSTEM BASED ON MACHINE LEARNING

CROSS REFERENCE TO RELATED APPLICATION

This application is a continuation-in-part of U.S. application Ser. No. 15/670,511 filed on Aug. 7, 2017 and entitled "IMAGE RECOGNITION METHOD AND SYSTEM BASED ON DEEP LEARNING" now pending.

BACKGROUND OF THE INVENTION

1. Field of the Invention

The present disclosure relates to an object detection method and system; more particularly, to an object detection method and system based on machine learning.

2. Description of Related Art

Deep learning is a division of machine learning, and originates from researches on artificial neural network. Basically, deep learning is a high-level abstract algorithm employing multilayer processing, which includes complex hierarchy or multiple nonlinear transformations. Therefore, deep learning is widely used in machine vision, speech recognition, natural language processing, audio recognition and bioinformatics.

Among the developed deep learning algorithms, deep convolutional neural network (CNN) is the one most used for image recognition. However, current models of deep convolutional neural network algorithm are mostly built and trained with high resolution images. In practice, however, the testing images are frequently in low resolution due to environmental or image sensor issues, thus affecting the accuracy of image recognition. Therefore, a technical solution to improve the aforementioned limitation is necessary.

SUMMARY OF THE INVENTION

The object of the present disclosure is to provide an object detection method based on machine learning, which includes the following steps: sensing a motion of an object by a motion sensor to generate a testing image; capturing the testing image by an image sensor to transmit a sensed image to an object detection device; and detecting a position of the object in the sensed image by the object detection device.

Preferably, the at least one parameter used by the image sensor when capturing the testing image includes a gain value or an exposure time, and the categorizing engine is a context-aware engine.

Preferably, the step of detecting a position of the object in the sensed image by the object detection device includes: using a machine learning (ML) device to process the sensed image to generate a learn image; using a motion filter to filter the learn image to generate a filtered image; and using a motion tracking device to process the filtered image to obtain the position of the object.

Preferably, the step of using a motion tracking device to process the filtered image to obtain the position of the object includes: comparing a raw data of the filtered image with a mean data of the filtered image to obtain a binary feature; and performing a cost process to two binary features at two adjacent timing points to obtain the position.

In order to achieve the aforementioned objects, according to an embodiment of the present disclosure, an object detection system based on machine learning includes a motion sensor for sensing a motion of an object by a motion sensor to generate a testing image; an image sensor for capturing and transmitting a testing image; and an object detection device for detecting a position of the object in the sensed image transmitted from the image sensor.

Preferably, the at least one parameter used by the image sensor when capturing the testing image includes a gain value or an exposure time, and the categorizing engine is a context-aware engine.

In the present disclosure, the object detection method and system based on machine learning categorizes a filtered image into the high resolution mode or the low resolution mode, then the filtered image is recognized by the appropriate recognizing engine, a comparator compares a raw data of the filtered image with a mean data of the filtered image to obtain a binary feature, and then a cost processor performs a cost process to two binary features at two adjacent timing points to obtain the position. Therefore, the present disclosure effectively increases the accuracy of object detection under various conditions.

In order to further the understanding regarding the present disclosure, the following embodiments are provided along with illustrations to facilitate the understanding of the present disclosure.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
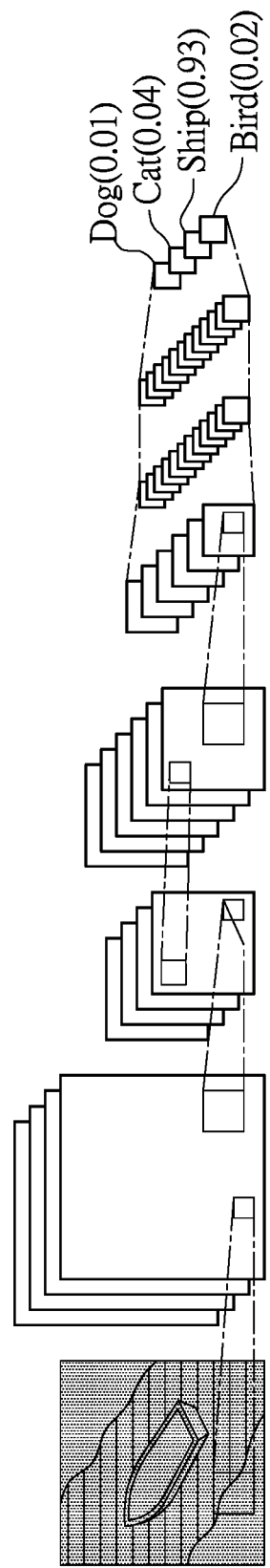
FIG. 1 shows a schematic diagram of an object detection method based on deep convolutional neural network algorithm according to an embodiment of the present disclosure.

FIG. 1 shows a schematic diagram of an object detection method based on deep convolutional neural network algorithm according to an embodiment of the present disclosure. It should be noted that the following descriptions are based on the present embodiment shown in FIG. 1, but the present disclosure is not limited thereto. A person having ordinary skill in the art may modify the architecture of machine learning to fit particular needs. In addition, details of the deep convolutional neural network algorithm are not addressed herein as it should have been known to a person having ordinary skill in the art.

A recognizing engine employing deep convolutional neural network algorithm and trained with high resolution sample images cannot accurately recognize a testing image with low resolution because the modeling and feature groups are built on high resolution images. Similarly, a recognizing engine trained with low resolution sample images cannot accurately recognize a testing image with high resolution because the modeling and feature groups are built on low resolution images.

In addition, training a recognizing engine, which employs deep convolutional neural network algorithm, with both high and low resolution images could lead to a massive, overcomplicated model. The modeling process would not converge easily and may fail to generate the feature groups. Therefore, a person having ordinary skill in the art could understand that the object detection method in the present disclosure resolves the aforementioned limitation by separately training a first recognizing engine with a first sample image group having high resolution and training a second recognizing engine with a second sample image group having low resolution separately. A first feature group is generated for high resolution images, and a second feature group is generated for low resolution images.

Figure 2:
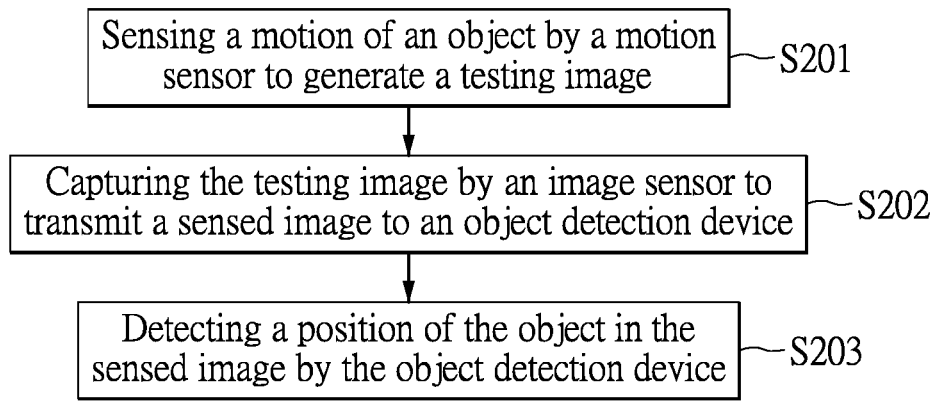
FIG. 2 shows a schematic flowchart of an object detection method based on machine learning according to the embodiment of the present disclosure.

FIG. 2 shows a schematic flowchart of an object detection method based on machine learning according to the present embodiment. Step 201 is sensing a motion of an object by a motion sensor to generate a testing image; step S202 is capturing the testing image by an image sensor to transmit a sensed image to an object detection device; and step S203 is detecting a position of the object in the sensed image by the object detection device.

Figure 3:
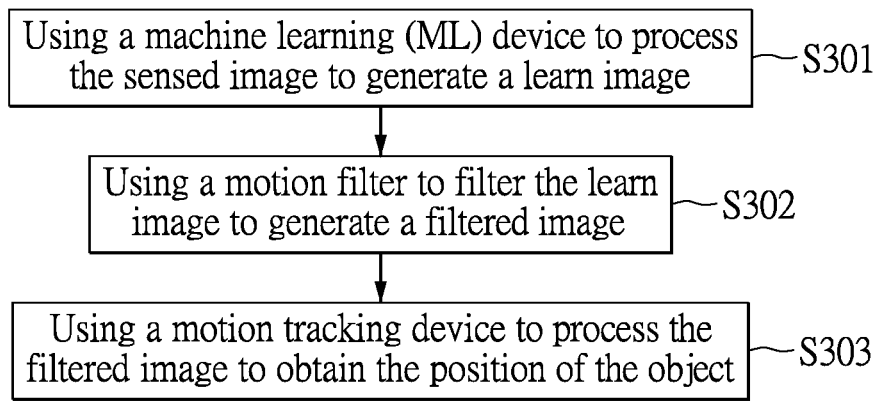
FIG. 3 shows a schematic flowchart of the step of detecting the position of the object in the sensed image by the object detection device according to the embodiment in FIG. 2.

FIG. 3 shows a schematic flowchart of the step of detecting the position of the object in the sensed image by the object detection device according to the embodiment in FIG. 2. Step S301 is using a machine learning (ML) device to process the sensed image to generate a learn image, step S302 is using a motion filter to filter the learn image to generate a filtered image, and step S303 is using a motion tracking device to process the filtered image to obtain the position of the object.

Figure 4:
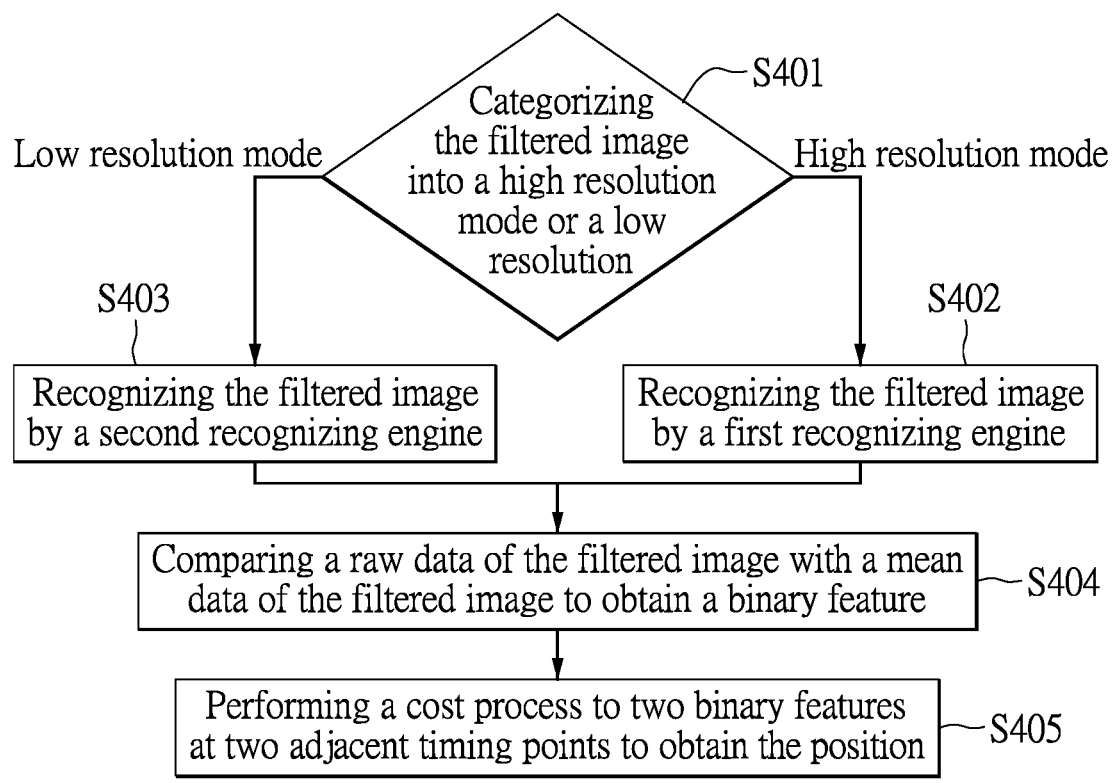
FIG. 4 shows a schematic flowchart of the step of using the motion tracking device to process the filtered image to obtain the position of the object according to the embodiment in FIG. 3.

FIG. 4 shows a schematic flowchart of the step of using the motion tracking device to process the filtered image to obtain the position of the object according to the embodiment in FIG. 3. Step S401 is categorizing the filtered image as a high resolution mode or a low resolution mode by a categorizing engine according to at least one parameter used by the image sensor when capturing the testing image. Then, according to the result of categorization, taking step S402, which is recognizing the filtered image by a first recognizing engine when the filtered image is categorized to the high resolution mode, or taking step S403, which is recognizing the filtered image by a second recognizing engine when the filtered image is categorized to the low resolution mode. Then step S404 is comparing a raw data of the filtered image with a mean data of the filtered image to obtain a binary feature, and step S405 is performing a cost process to two binary features at two adjacent timing points to obtain the position. The first recognizing engine and the second recognizing engine employ non-identical learning algorithms.

It should be noted that step S402 and S403 are in parallel and not mutually exclusive. In addition, the first recognizing engine is provided with the first feature group when recognizing the filtered image. Similarly, the second recognizing engine is provided with the second feature group when recognizing the filtered image. The details of employing a feature group by a recognizing engine when recognizing a filtered image should be known to a person having ordinary skill in the art, and therefore is not described herein. In addition, in step S404, if the raw data of the filtered image is greater than the mean data of the filtered image, the binary feature obtained is 1, otherwise, the binary feature obtained is 0. Then, in step S405, the binary features of two binary features at two adjacent timing points are used as parameters of a cost function to be calculated to obtain the position.

The image sensor could be a camera or a scanner for capturing a testing image. The first recognizing engine could employ a deep convolutional neural network algorithm, and the second recognizing engine could employ a boosting algorithm. However, the present disclosure does not intend to limit the type of image sensor and the algorithm employed by the first and second recognizing engines.

Therefore, the core concept of the object detection method in the present disclosure is to separately train a recognizing engine for high resolution images and a recognizing engine for low resolution images. The two recognizing engines generate two independent feature groups (i.e., two independent models) specifically for high resolution and low resolution images respectively. A categorizing engine categorizes a filtered image into the high resolution mode or the low resolution mode, and then the filtered image is recognized by the appropriate recognizing engine. Therefore, the present disclosure increases the accuracy of image recognition under various environmental (or image resolution) conditions.

Specifically, the at least one parameter includes a gain value or an exposure time, and the categorizing engine is a context-aware engine. That is, the context-aware engine categorizes the filtered image into the high resolution mode or the low resolution mode based on the gain value or the exposure time. To be more specific, when the light sensed by the image sensor is deficient, the image sensor would extend the time for light sensing, whereby by observing that the exposure time to be greater than a first threshold, the image sensor would be determined to be in a low resolution mode. When the image sensor is overexposed, the image sensor shortens the exposure time, in which when the exposure time is found to be smaller than a second threshold, overexposure would thus be determined, and the image sensor would also be determined to be in a low resolution mode. When the light sensed by the image sensor is moderate, the exposure time adjusted by the image sensor would fall within the first threshold and the second threshold, and the image sensor would therefore be determined to be in a high resolution mode. The first threshold is larger than the second threshold.

Similarly, the gain value is the level of gain applied on the filtered image. A high gain value not only increases the intensity of the image, but also the intensity of the noise. Therefore, the categorizing engine could categorize the filtered image into the low resolution mode if the gain value of the filtered image exceeds a threshold. It should be noted that the present disclosure is not limited by the present embodiment, in which the categorizing engine categorizes the filtered image based on exposure time, gain value or the combination thereof. A person having ordinary skill in the art could change the parameters used by the categorizing engine (i.e., the context-aware engine) to fit particular needs.

Figure 5:
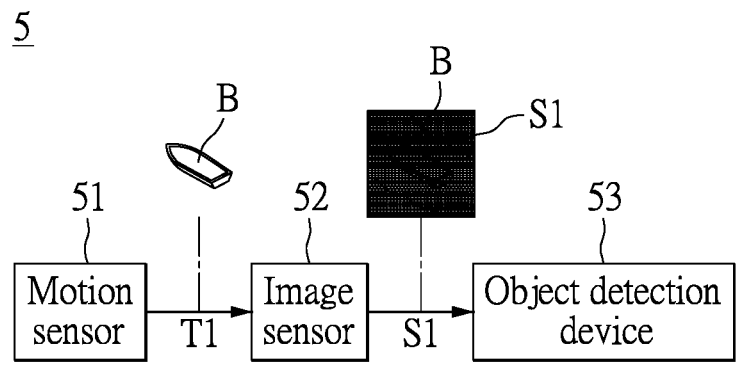
FIG. 5 shows a schematic block diagram of an object detection system based on machine learning according to an embodiment of the present disclosure.
Figure 6A:
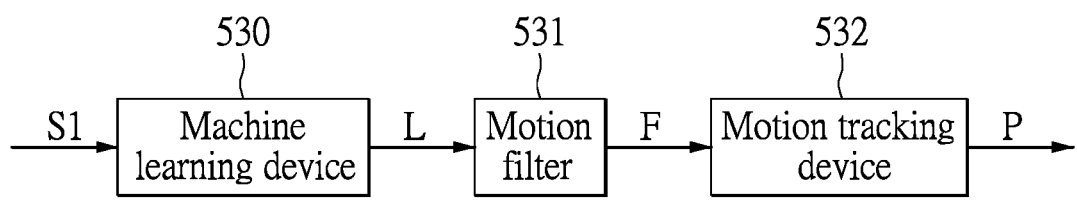
FIG. 6A shows a schematic block diagram of the object detection device of the object detection system according to the embodiment in FIG. 5.
Figure 6B:
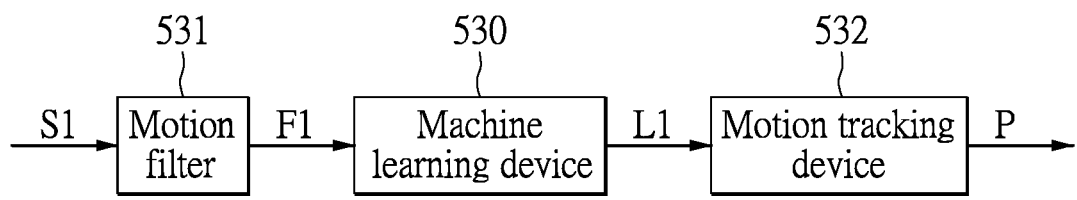
FIG. 6B shows another schematic block diagram of the object detection device of the object detection system according to the embodiment in FIG. 5.
Figure 6C:
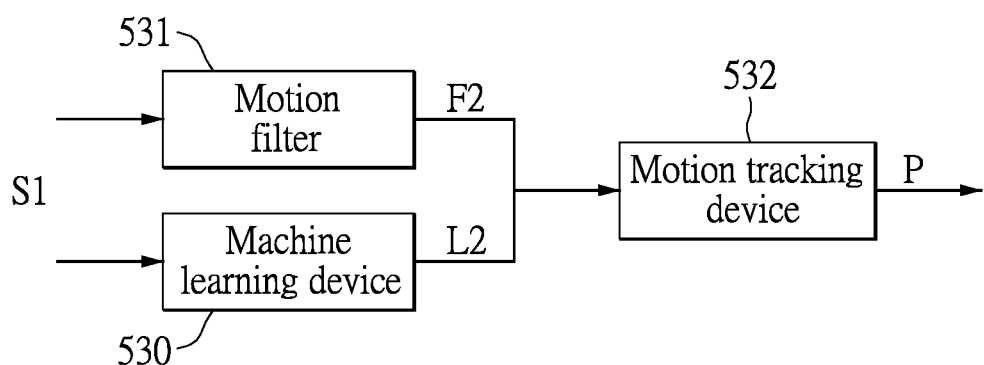
FIG. 6C shows yet another schematic block diagram of the object detection device of the object detection system according to the embodiment in FIG. 5.

The present disclosure further provides an object detection system based on the aforementioned object detection method. FIG. 5 shows a schematic block diagram of an object detection system based on machine learning according to an embodiment of the present disclosure. FIGS. 6A-6C show schematic block diagrams of the object detection device of the object detection system according to the embodiment in FIG. 5. It should be noted that the present disclosure is not limited by the embodiment shown in FIG. 5 and FIGS. 6A-6C.

Specifically, the object detection system 5 includes a motion sensor 51 for sensing a motion of an object B to generate a testing image T1; an image sensor 52 for capturing the testing image T1 and transmitting a sensed image S1; and an object detection device 53 for detecting a position of object B in the sensed image S1 transmitted from the image sensor 52.

As shown in FIG. 6A, the object detection device 53 includes: a machine learning (ML) device 530 for processing the sensed image S1 to generate a learn image L; a motion filter 531 for filtering the learn image L to generate a filtered image F; and a motion tracking device 532 for processing the filtered image F to obtain the position P of object B.

As shown in FIG. 6B, an object detection device 54 includes: a motion filter 531 for filtering the sensed image S1 to generate a filtered image F1; a machine learning (ML) device 530 for processing the filtered image F1 to generate a learn image L1; and a motion tracking device 532 for processing the learn image L1 to obtain the position P of object B.

As shown in FIG. 6C, an object detection device 55 includes: a motion filter 531 for filtering the sensed image S1 to generate a filtered image F2; a machine learning (ML) device 530 for processing the sensed image S1 to generate a learn image L2; and a motion tracking device 532 for processing the filtered image F2 and the learn image L2 to obtain the position P of object B.

As mentioned above, the object detection device 54 and the object detection device 55 are alternative elements for the object detection device 53, and the present disclosure is not limited thereto.

Figure 7A:
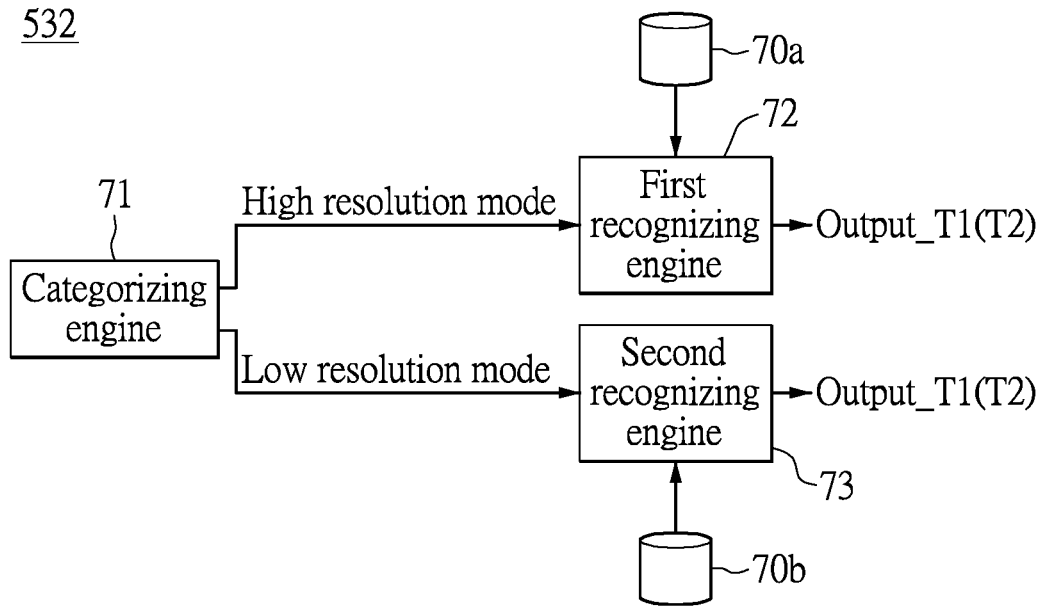
FIG. 7A shows a schematic block diagram of a first part of the motion tracking device according to the embodiment in FIG. 6A.
Figure 7B:
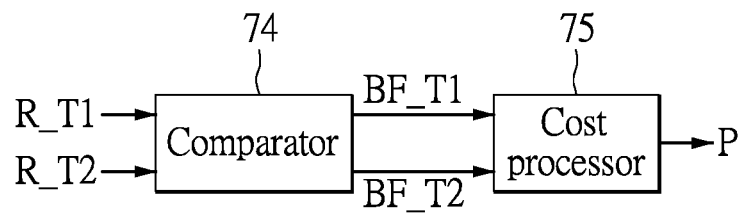
FIG. 7B shows a schematic block diagram of a second part of the motion tracking device according to the embodiment in FIG. 6A.

FIG. 7A shows a schematic block diagram of a first part of the motion tracking device according to the embodiment in FIG. 6A, and FIG. 7B shows a schematic block diagram of a second part of the motion tracking device according to the embodiment in FIG. 6A. The motion tracking device 532 includes a categorizing engine 71, a first recognizing engine 72 and a second recognizing engine 73, which are implemented in hardware or software. In addition, the categorizing engine 71, the first recognizing engine 72 and the second recognizing engine 73 could be implemented integrally or separately, the present disclosure not being limited thereto. The first recognizing engine 72 is trained with a high resolution sample image group (not shown in drawings) and generates a first feature group 70a, and the second recognizing engine 73 is trained with a low resolution sample image group (not shown in drawings) and generates a second feature group 70b. The comparator 74 compares a raw data R_T1 of the filtered image Output_T1 with a mean data M_T1 of the filtered image Output_T1 to obtain a binary feature BF_T1 at time point t1, and compares a raw data R_T2 of the filtered image Output_T2 with a mean data M_T2 of the filtered image Output_T2 to obtain a binary feature BF_T2 at time point t2, the time point t1 and the time point t2 are adjacent. Then the cost processor 75 performs a cost process to the two binary features BF_T1 and BF_T2, at two adjacent timing points t1 and t2, to obtain the position P.

It should be noted that the object detection system 5 could conduct the method shown in FIG. 4. That is, the categorizing engine 71 categorizes the filtered image F to the high resolution mode or the low resolution mode according to at least one parameter used by the image sensor 52 when capturing the testing image T1.

The first recognizing engine 72, which employs a deep convolutional neural network algorithm, recognizes the filtered image F when the filtered image F is categorized to the high resolution mode. The second recognizing engine 73, which employs a boosting algorithm, recognizes the filtered image F when the filtered image F is categorized to the low resolution mode. It should be noted that the algorithm employed by the first recognizing engine 72 is not limited to the deep convolutional neural network and the algorithm employed by the second recognizing engine 73 is not limited to the boosting algorithm in the present disclosure.

As described previously, the at least one parameter used by the image sensor 52 when capturing the testing image T1 includes a gain value or an exposure time, and the categorizing engine is a context-aware engine. A person having ordinary skill in the art should understand that the core concept of the object detection system in the present disclosure is to train a recognizing engine for high resolution images and a recognizing engine for low resolution image separately. The two recognizing engines generate two independent feature groups (i.e., two independent models) specifically for high resolution and low resolution images respectively. The categorizing engine categorizes a testing image into the high resolution mode or the low resolution mode, and then the testing image is recognized by the appropriate recognizing engine. Therefore, the present disclosure increases the accuracy of image recognition under various environmental (image resolution) conditions.

On the other hand, if the first recognizing engine 72 employs the deep convolutional neural network algorithm shown in FIG. 1, a person having ordinary skill in the art should understand that the number of the first feature group 70a increases as the layer of convolution increases when training the first recognizing engine with the first sample image group. Therefore, the object detection system 5 should include a memory that could store a great number of the first feature group 70a in order to be successfully implemented in hardware. The present disclosure provides a solution to address the above issue.

Figure 8:
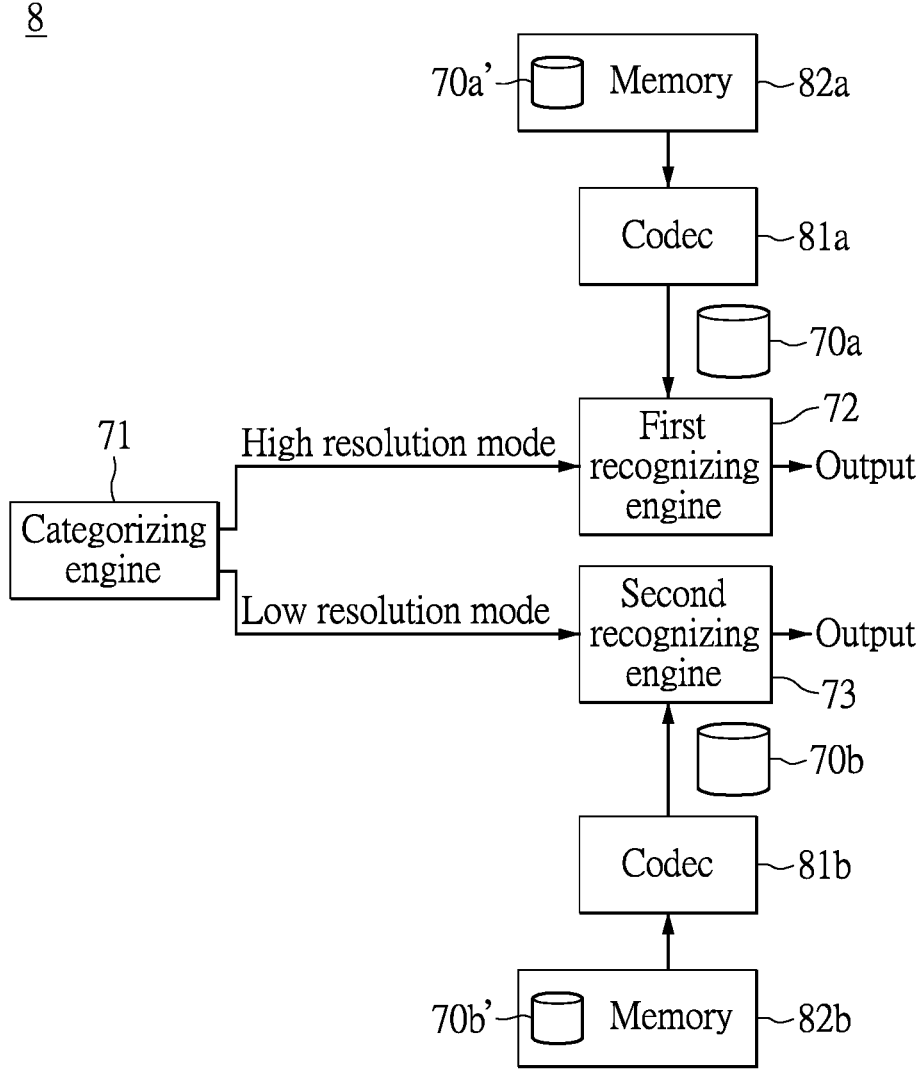
FIG. 8 shows a schematic block diagram of an object detection system based on machine learning according to another embodiment of the present disclosure.

FIG. 8 shows a schematic block diagram of an object detection system based on machine learning according to another embodiment of the present disclosure. In contrast to FIG. 7A, the object detection system 8 in FIG. 8 includes not only the categorizing engine 71, the first recognizing engine 72 and the second recognizing engine 73, but also at least one codec 71. It should be noted that the following embodiment includes a codec 81a and a codec 81b to facilitate the understanding of the object detection system 8, but the number of codec in the present disclosure is not limited thereto. That is, the codec 81a and codec 81b could be the same codec 81 or two different codecs, but the present disclosure is not limited thereto. In addition, the codec 81a and codec 81b could be implemented in hardware or software, but the present disclosure is not limited thereto.

Specifically, the codec 81a encodes the feature group 70a, and the codec 81b encodes the feature group 70b. The encoded first feature group 70a' and the encoded second feature group 70b' are stored in a memory 82 of the object detection system 8. It should be noted that the present embodiment includes a memory 82a and a memory 82b to facilitate the understanding of the object detection system 8, but the number of memory in the present disclosure is not limited thereto. That is, the memory 82a and memory 82b could be the same memory 82 or two different memories, but the present disclosure is not limited thereto. In addition, the memory 82a and memory 82b could be a flash memory, but the present disclosure is not limited thereto.

Referring to FIG. 8, for example, the codec 81a encodes the first feature group 70a, and the encoded first feature group 70a' is stored in the memory 82a. Similarly, the codec 81b encodes the second feature group 70b, and the encoded second feature group 70b' is stored in the memory 82b. It should be noted that the present disclosure does not intend to limit the encoding method used by the codec 81a and codec 81b when encoding the first feature group 70a and second feature group 70b. A person having ordinary skill in the art may employ different codecs to fit particular needs. In this regard, the object detection system 8 in the present embodiment could effectively resolve the conventional need for storage of a great number of feature groups, and reduce the cost of hardware of the object detection system 8.

Referring to FIG. 7A again, when the filtered image F is categorized to the high resolution mode, the first feature group 70a is provided to the first recognizing engine 72 for recognizing the filtered image F. Applying the same process in the object detection system shown in FIG. 8, when the filtered image F is categorized to the high resolution mode, the object detection system 8 decodes the encoded first feature group 70a' stored in the memory 82a by the codec 81a, and the first feature group 70a is provided to the first recognizing engine 72 for recognizing the filtered image F.

Similarly, when the filtered image F is categorized to the low resolution mode, the object detection system 8 decodes the encoded second feature group 70b' stored in the memory 82b by the codec 81b, and the second feature group 70b is provided to the first recognizing engine 73 for recognizing the filtered image F. As described previously, the details of employing a feature group by a recognizing engine when recognizing a filtered image should be known to a person having ordinary skill in the art, and is not describe herein.

Figure 9:
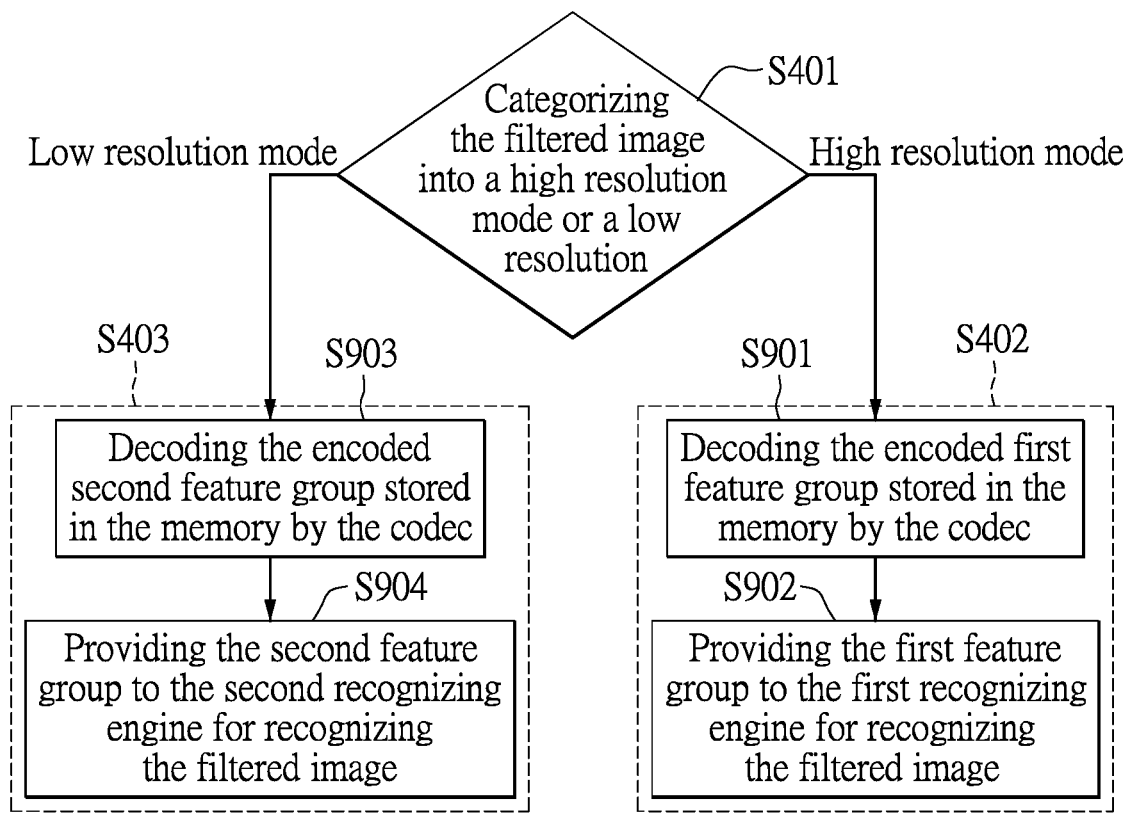
FIG. 9 shows a schematic flowchart of an object detection method using the object detection system shown in FIG. 8.

FIG. 9 shows a schematic flowchart of an object detection method using the object detection system 8 shown in FIG. 8, and the details of the object detection system 8 are not reiterated herein. Some of the steps in FIG. 9 are identical to and use the same symbols as those in FIG. 4, and therefore are not reiterated herein.

Referring to FIG. 9, step S402 and step S403 further include steps S901-S902 and steps S903-S904, respectively. Step S901 is decoding the encoded first feature group stored in the memory by the codec when the filtered image is categorized to the high resolution mode. Step S902 is providing the first feature group to the first recognizing engine for recognizing the filtered image. Step S903, on the other hand, is decoding the encoded second feature group stored in the memory by the codec when the filtered image is categorized to the low resolution mode. Step S904 is providing the second feature group to the second recognizing engine for recognizing the filtered image.

Therefore, the core concept of the method and system of image recognition based on machine learning in the present disclosure is to train a recognizing engine for high resolution images and a recognizing engine for low resolution images separately. The two recognizing engines generate two independent feature groups specifically for high resolution and low resolution images respectively. The context-aware engine (i.e., the categorizing engine 71) categorizes a filtered image into the high resolution mode or the low resolution mode, and then the filtered image is recognized by the appropriate recognizing engine. Therefore, the present disclosure increases the accuracy of image recognition under various conditions. In addition, the present disclosure further includes a codec to encode the feature groups generated by the recognizing engines after training so that the memory does not have to store a great number of feature groups. Therefore, the present disclosure reduces cost of hardware of the object detection system.

Figure 10:
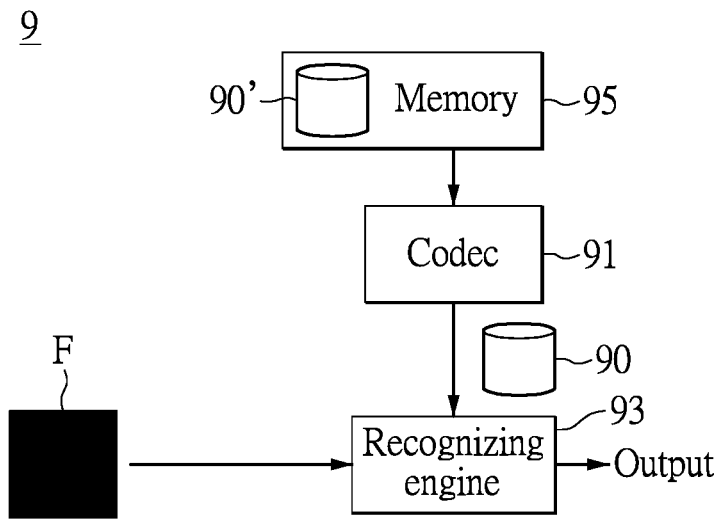
FIG. 10 shows a schematic block diagram of an object detection system based on machine learning according to another embodiment of the present disclosure.

The following embodiment is another example showing how the present disclosure reduces the cost of hardware of the object detection system by including a codec. FIG. 10 shows a schematic block diagram of an object detection system based on machine learning according to another embodiment of the present disclosure. In contrast to FIG. 8, the object detection system 9 in FIG. 10 includes at least one codec 91 and a recognizing engine 93. The recognizing engine is trained with a sample image group (not shown in drawings) and generates a feature group 90, which corresponds to the sample image group.

The codec 91 encodes the feature group 90, and the encoded feature group 90' is stored in at least one memory 95. The recognizing engine 93 recognizes a filtered image F. When recognizing the filtered image F, the object detection system 9 decodes the encoded first feature group 90' stored in the memory 95 by the codec 91, and the first feature group 90 is provided to the recognizing engine 93 for recognizing the filtered image F. It should be noted that the recognizing engine 93 could employ a deep convolutional neural network algorithm, but the present disclosure is not limited thereto.

Figure 11:
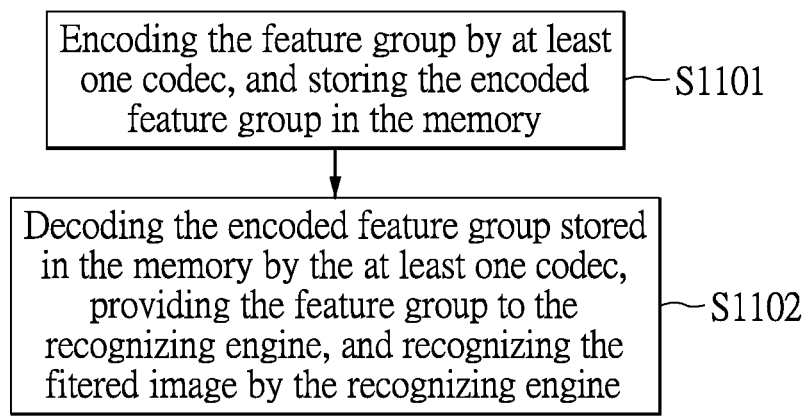
FIG. 11 shows a schematic flowchart of an object detection method using the object detection system shown in FIG. 10.

FIG. 11 shows a schematic flowchart of an object detection method using the object detection system 9 shown in FIG. 10, and the details of the object detection system 9 are not reiterated herein.

Step S1101 is encoding the feature group by at least one codec, and storing the encoded feature group in at least one memory. Step S1102 is decoding the encoded feature group stored in the at least one memory by the at least one codec when recognizing a filtered image, and then providing the feature group to the recognizing engine for recognizing the filtered image.

When the recognizing engine 93 employs the deep convolutional neural network algorithm, as shown in FIG. 1, a person having ordinary skill in the art should understand that the time span for recognizing the filtered image F increases as the layer of convolution increases. Therefore, the object detection system 9 has to undergo a time-consuming and computation-intensive process to determine if the filtered image F includes a specific element by the recognizing engine employing the deep convolutional neural network algorithm. The present disclosure provides a solution to address the above issue.

Figure 12:
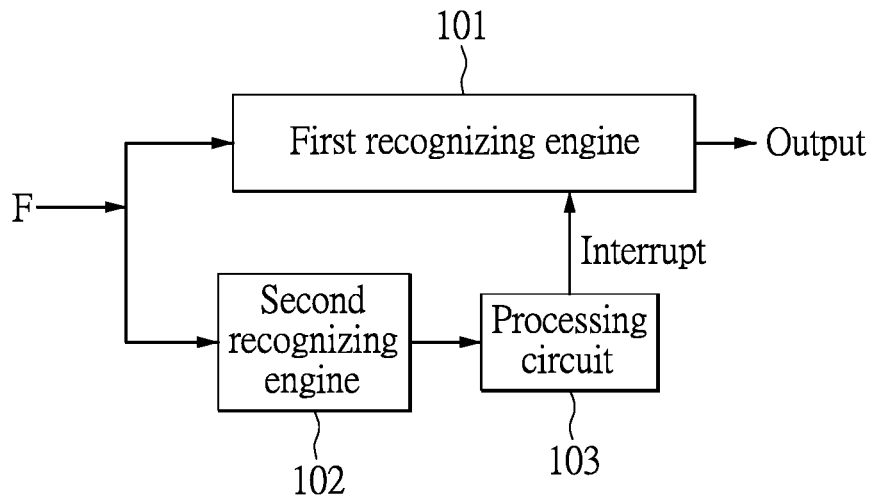
FIG. 12 shows a schematic block diagram of an object detection system based on machine learning according to another embodiment of the present disclosure.

FIG. 12 shows a schematic block diagram of an object detection system based on machine learning according to another embodiment of the present disclosure. Some of the elements in FIG. 12 are identical to and use the same symbols as FIGS. 7A, 7B, 8, and 10, and therefore are not reiterated herein. In contrast to FIG. 10, the object detection system 10 in FIG. 12 includes a first recognizing engine 101, at least one second recognizing engine 102 and a processing circuit 103. It should be noted that the first recognizing engine 101, the at least one second recognizing engine 102 and the processing circuit 103 could be implemented in hardware, or implemented in the combination of hardware and software. The present disclosure does not intend to limit the implementation of the elements in the object detection system 10. In addition, the first recognizing engine 101, the at least one second recognizing engine 102 and the processing circuit 103 could be implemented integrally or separately, the present disclosure not being limited thereto.

The present embodiment includes one second recognizing engine 85 to facilitate the understanding of the image recognizing system 10, but the present disclosure is not limited thereto. Specifically, the filtered image F is recognized by the first recognizing engine 101. In addition, the filtered image F is also recognized by the second recognizing engine 102.

In particular, the object detection system 10 activates the second recognizing engine 102 to recognize the filtered image F when recognizing the filtered image F by the first recognizing engine 101. The processing circuit 103 determines whether to interrupt the first recognizing engine 101 recognizing the filtered image F according to a result (not shown in drawings) outputted by the second recognizing engine 102 after completing the recognition of the filtered image F.

Similar to the object detection system 9 in FIG. 10, a person having ordinary skill in the art should understand that the object detection system 10 obtains the filtered image F without the image sensor, and transmits the filtered image F to the first recognizing image 101 and the second recognizing engine 102 directly. In addition, the object detection system 10 could further include a codec (not shown in drawings) and a memory (not shown in drawings). The functions of the codec and memory have been addressed previously and are not reiterated herein.

In one exemplary configuration of the embodiment, the first recognizing engine 101 and the second recognizing engine 102 could both employ the convolutional neural network algorithm, and the convolutional layer in the first recognizing engine 101 is different from a convolutional layer in the second recognizing engine 102. That is, one feature group generated by the training process could be provided to both the first and second recognizing engines. In practice, the first recognizing engine could employ a deep convolutional neural network algorithm and the second recognizing engine could employ a shallow convolutional neural network algorithm.

In another exemplary configuration of the embodiment, the first recognizing engine 101 and the second recognizing engine 102 could employ non-identical machine learning algorithms. In practice, the first recognizing engine 101 could employ, for example, the deep convolutional neural network algorithm, and the second recognizing engine could employ, for example, an algorithm having a feature extraction circuit and a classifier. It should be noted that the present disclosure does not intend to limit the implementation of the feature extraction circuit and the classifier, a person having ordinary skill in the art could modify the design to fit particular needs.

Obviously, both exemplary configurations indicate that the second recognizing engine 102 could complete the image recognition process faster than the first recognizing engine 101. Therefore, the core concept of the present embodiment is to screen the filtered image F by the additional second recognizing engine 102, and determine if the filtered image F includes the specific element by the processing circuit 103 of the object detection system 10. If the result of the screening has shown that the filtered image F does not include the specific element, the processing circuit 103 interrupts the recognition of the filtered image F by the first recognizing engine 101. In this regard, the object detection system 10 prevents unnecessary computation effort and time.

Figure 13:
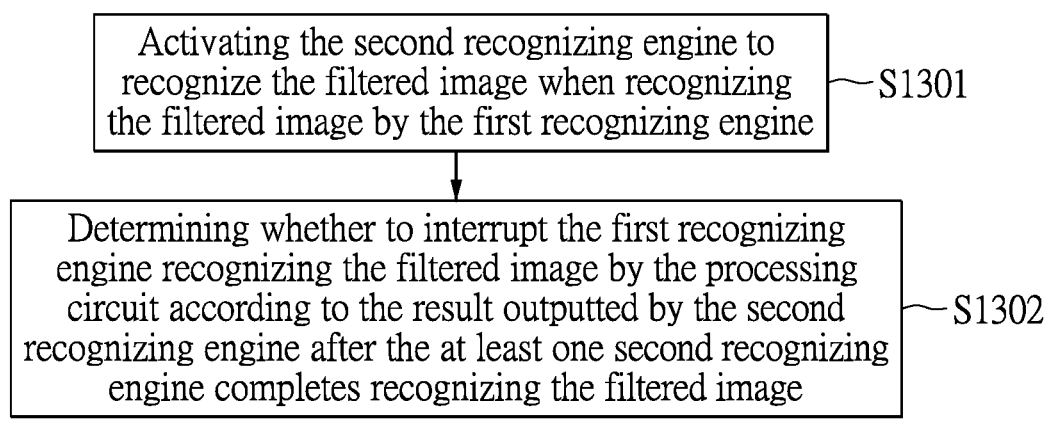
FIG. 13 shows a schematic flowchart of an object detection method using the object detection system shown in FIG. 12.

FIG. 13 shows a schematic flowchart of an object detection method using the object detection system 10 shown in FIG. 12, and the details of the object detection system 10 are not reiterated herein.

Step S1301 is activating the second recognizing engine to recognize the filtered image when recognizing the filtered image by the first recognizing engine. Step S1302 is determining whether to interrupt the recognition of the filtered image by the first recognizing engine by the processing circuit according to the result outputted by the second recognizing engine after recognition of the filtered image by the second recognizing engine is completed.

Figure 14:
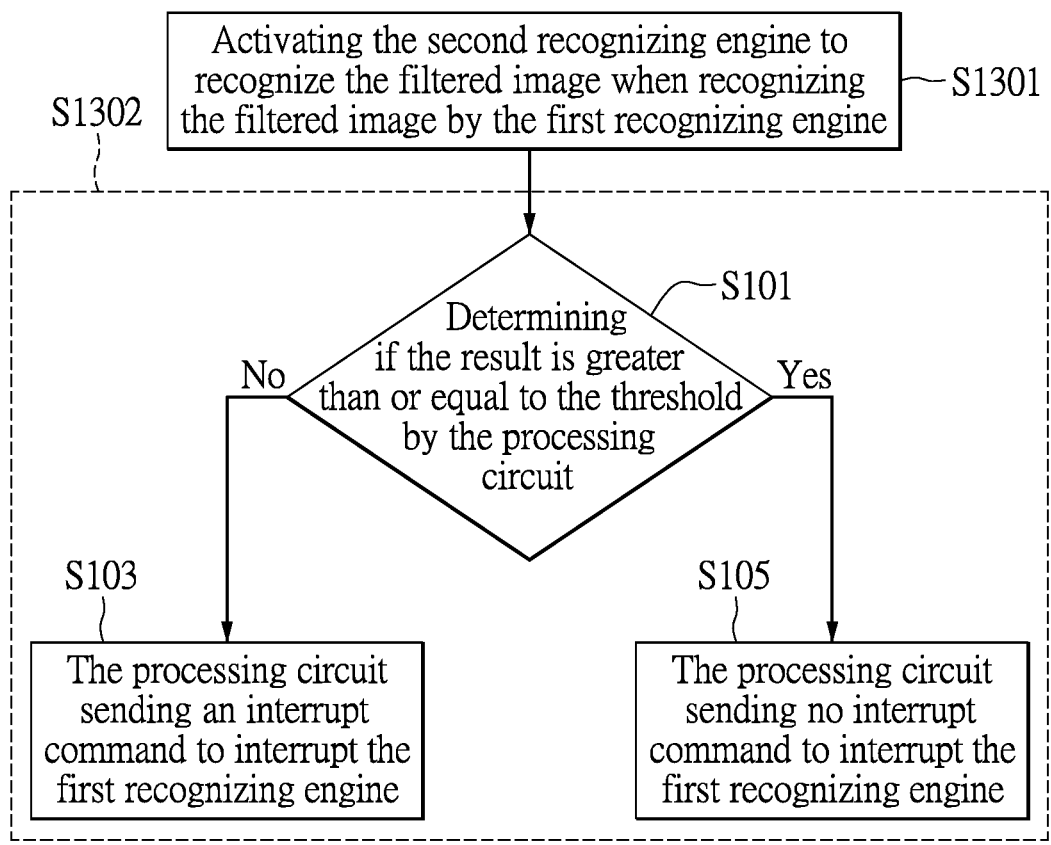
FIG. 14 shows a schematic flowchart of an object detection method based on machine learning according to an embodiment of the present disclosure.

It should be noted that the following describes how the processing circuit determines whether to interrupt the recognition of the filtered image by the first recognizing engine. FIG. 14 shows a schematic flowchart of an object detection method based on machine learning according to an embodiment of the present disclosure. Some of the steps in FIG. 14 are identical to and use the same symbols as FIG. 13, and therefore are not reiterated herein.

As described previously, the second recognizing engine could employ, for example, a shallow convolutional neural network algorithm or an algorithm having a feature extraction circuit and a classifier. Therefore, the result outputted by the second recognizing engine indicates if the filtered image includes a specific element. In practice, the result could be a probability value. In this case, a high value of probability indicates that the specific element is very likely to be included in the filtered image.

In this regard, step S1302 could further include steps S101-S105. Firstly, step S101 is determining if the result is greater than or equal to a threshold. Next, in step S103, the processing circuit sends an interrupt command to interrupt the first recognizing engine from recognizing the filtered image if the result is less than the threshold. Otherwise, in step S105, the processing circuit sends no interrupt command to interrupt the first recognizing engine from recognizing the filtered image if the result is greater than or equal to the threshold.

In other words, the processing circuit interrupts the recognition of the filtered image by the first recognizing engine when the result is less than the threshold, which suggests that the probability of the specific element being included in the filtered image is low. This step prevents unnecessary computation effort and time. On the other hand, the processing circuit does not interrupt the recognition of the filtered image by the first recognizing engine when the result is greater than or equal to the threshold, which suggests that the probability of the specific element being included in the filtered image is high. The step allows the highly accurate first recognizing engine, which employs the deep convolutional neural network algorithm, to continue the recognition of the filtered image. The effect of the deep convolutional neural network algorithm has been described previously, and is thus not reiterated herein.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. An object detection method based on machine learning, comprising:
    sensing a motion of an object by a motion sensor to generate a testing image;
    capturing the testing image by an image sensor to transmit a sensed image to an object detection device; and
    detecting a position of the object in the sensed image by the object detection device;
    wherein the step of detecting the position of the object in the sensed image by the object detection device includes:
    using a machine learning (ML) device to process the sensed image to generate a learn image;
    using a motion filter to filter the learn image to generate a filtered image; and
    using a motion tracking device to process the filtered image to obtain the position of the object;
    wherein the step of using the motion tracking device to process the filtered image to obtain the position of the object includes:
    categorizing the filtered image to a high resolution mode or a low resolution mode by a categorizing engine of the ML device according to at least one parameter used by the image sensor when capturing the testing image;
    recognizing the filtered image by a first recognizing engine of the ML device when the filtered image is categorized to the high resolution mode;
    recognizing the filtered image by a second recognizing engine of the ML device when the filtered image is categorized to the low resolution mode;
    comparing a raw data of the filtered image with a mean data of the filtered image to obtain a binary feature; and
    performing a cost process to two binary features at two adjacent timing points to obtain the position;
    wherein the first recognizing engine and the second recognizing engine employ non-identical learning algorithms.

2. The object detection method according to claim 1, wherein the step of using the motion tracking device to process the filtered image to obtain the position of the object further includes:
    training the first recognizing engine with a first sample image group which associates with the high resolution mode, and generating a first feature group which corresponds to the first sample image group; and
    training the second recognizing engine with a second sample image group which associates with the low resolution mode, and generating a second feature group which corresponds to the second sample image group.

3. The object detection method according to claim 2, wherein the step of using the motion tracking device to process the filtered image to obtain the position of the object further includes:
    encoding the first feature group and the second feature group by at least one codec; and
    storing the encoded first feature group and the encoded second feature group in at least one memory.

4. The object detection method according to claim 3, wherein the step of recognizing the filtered image by the first recognizing engine further includes:
    decoding the encoded first feature group stored in the memory by the codec;
    providing the first feature group to the first recognizing engine;
    recognizing the filtered image with the first feature group by the first recognizing engine.

5. The object detection method according to claim 3, wherein the step of recognizing the filtered image by the second recognizing engine further includes:
    decoding the encoded second feature group stored in the memory by the codec;
    providing the second feature group to the second recognizing engine;
    recognizing the filtered image with the second feature group by the second recognizing engine.

6. The object detection method according to claim 1, wherein the first recognizing engine employs a deep convolutional neural network algorithm, and the second recognizing engine employs a boosting algorithm.

7. The object detection method according to claim 1, wherein the at least one parameter includes a gain value or an exposure time, and the categorizing engine is a context-aware engine.

8. An object detection system based on machine learning, comprising:
    a motion sensor for sensing a motion of an object to generate a testing image;
    an image sensor for capturing the testing image and transmitting a sensed image; and
    an object detection device for detecting a position of the object in the sensed image transmitted from the image sensor;
    wherein the object detection device includes:
    a machine learning device for processing the sensed image to generate a learn image;
    a motion filter for filtering the learn image to generate a filtered image; and
    a motion tracking device for processing the filtered image to obtain the position of the object;
    wherein the motion tracking device includes:
    a categorizing engine for categorizing the filtered image into a high resolution mode or a low resolution mode according to at least one parameter used by the image sensor when capturing the testing image;

a first recognizing engine for recognizing the filtered image when the filtered image is categorized to the high resolution mode;

a second recognizing engine for recognizing the filtered image when the filtered image is categorized to the low resolution mode;

a comparator for comparing a raw data of the filtered image with a mean data of the filtered image to obtain a binary feature; and a cost processor for performing a cost process to two binary features at two adjacent timing points to obtain the position;

wherein the first recognizing engine and the second recognizing engine employ non-identical learning algorithms.

9. The object detection system according to claim 8, wherein the first recognizing engine is trained with a first sample image group which associates with the high resolution mode, and generates a first feature group which corresponds to the first sample image group;

wherein the second recognizing engine is trained with a second sample image group which associates with the low resolution mode, and generates a second feature group which corresponds to the second sample image group.

10. The object detection system according to claim 9, wherein the motion tracking device further includes:

at least one codec for encoding the first feature group and the second feature group; and a memory for storing the encoded first feature group and the encoded second feature group.

11. The object detection system according to claim 10, wherein the system conducts the following steps to recognize the filtered image by the first recognizing engine:

decoding the encoded first feature group stored in the memory by the codec;

providing the first feature group to the first recognizing engine;

recognizing the filtered image with the first feature group by the first recognizing engine.

12. The object detection system according to claim 10, wherein the system conducts following steps to recognize the filtered image by the second recognizing engine:

decoding the encoded second feature group stored in the memory by the codec;

providing the second feature group to the second recognizing engine;

recognizing the filtered image with the second feature group by the second recognizing engine.

13. The object detection system according to claim 8, wherein the first recognizing engine employs a deep convolutional neural network algorithm, and the second recognizing engine employs a boosting algorithm.

14. The object detection system according to claim 8, wherein the at least one parameter includes a gain value or an exposure time, and the categorizing engine is a context-aware engine.

15. An object detection method based on machine learning, including steps of:

encoding a feature group by at least one codec;

storing the encoded feature group in a memory;

decoding the encoded feature group stored in the memory by the at least one codec;

providing the feature group to a recognizing engine; and recognizing the testing image with the feature group by the recognizing engine;

wherein the object detection method further includes steps of training the recognizing engine with a sample image group, and generating the feature group which corresponds to the sample image group.

* * * * *